(12) United States Patent
Zhou

(10) Patent No.: US 11,264,039 B2
(45) Date of Patent: Mar. 1, 2022

(54) SPACE DIVISION METHOD AND APPARATUS, AND STORAGE MEDIUM

(71) Applicant: Beijing Xiaomi Intelligent Technology Co., Ltd., Beijing (CN)

(72) Inventor: Lingsong Zhou, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 0 days.

(21) Appl. No.: 16/879,757

(22) Filed: May 20, 2020

(65) Prior Publication Data
US 2021/0151059 A1    May 20, 2021

(30) Foreign Application Priority Data
Nov. 18, 2019  (CN) .......................... 201911129138.0

(51) Int. Cl.
| | | |
|---|---|---|
| H04R 5/00 | (2006.01) | |
| G10L 19/008 | (2013.01) | |
| G06F 3/16 | (2006.01) | |
| H04S 7/00 | (2006.01) | |

(52) U.S. Cl.
CPC ............ *G10L 19/008* (2013.01); *G06F 3/165* (2013.01); *H04S 7/30* (2013.01)

(58) Field of Classification Search
CPC ...................................................... H04R 5/00
See application file for complete search history.

(56) References Cited

U.S. PATENT DOCUMENTS

| | | | | |
|---|---|---|---|---|
| 8,750,473 | B2 * | 6/2014 | Cook | ............... H04M 1/72409 |
| | | | | 379/93.37 |
| 9,438,440 | B2 * | 9/2016 | Burns | ..................... G01S 11/16 |
| 10,458,840 | B2 * | 10/2019 | Barjatia | .................... G01H 7/00 |
| 10,999,691 | B2 * | 5/2021 | Wang | ...................... H04S 3/008 |
| 2002/0035407 | A1 | 3/2002 | Ishito et al. | |
| 2010/0094633 | A1 | 4/2010 | Kawamura et al. | |
| 2011/0317522 | A1 * | 12/2011 | Florencio | .............. G01S 3/8006 |
| | | | | 367/129 |
| 2013/0142341 | A1 | 6/2013 | Del Galdo et al. | |

(Continued)

FOREIGN PATENT DOCUMENTS

| | | |
|---|---|---|
| CN | 1208288 A | 2/1999 |
| CN | 101636783 A | 1/2010 |

(Continued)

OTHER PUBLICATIONS

Extended European search report of counterpart EP application No. 20179951.7 dated Dec. 2, 2020.

(Continued)

*Primary Examiner* — Olisa Anwah
(74) *Attorney, Agent, or Firm* — Syncoda LLC; Feng Ma

(57) ABSTRACT

A space division method includes: receiving a first sound signal that is a medium-high frequency sound signal; decoding the first sound signal by specified decoding to obtain device information of a sound source device that emits the first sound signal; and generating space division information when the device information of the sound source device is successfully obtained, wherein the space division information is configured to indicate that the sound source device and the sound collection device are located in the same spatial region.

18 Claims, 8 Drawing Sheets

(56) References Cited

U.S. PATENT DOCUMENTS

| | | | |
|---|---|---|---|
| 2014/0283136 A1* | 9/2014 | Dougherty | G06F 21/6218 |
| | | | 726/29 |
| 2018/0024811 A1* | 1/2018 | De Vaan | H04W 12/08 |
| | | | 704/275 |
| 2018/0098167 A1 | 4/2018 | Welch et al. | |
| 2018/0338212 A1 | 11/2018 | Kim et al. | |
| 2019/0028484 A1* | 1/2019 | Truong | H04L 63/107 |
| 2019/0081810 A1* | 3/2019 | Jung | G10L 15/30 |
| 2019/0253802 A1 | 8/2019 | Wang | |

FOREIGN PATENT DOCUMENTS

| | | | |
|---|---|---|---|
| CN | 104185869 A | 12/2014 | |
| CN | 107026934 A | 8/2017 | |
| CN | 109997370 A | 7/2019 | |
| CN | 110603585 A | 12/2019 | |

OTHER PUBLICATIONS

Chunyi Peng et al; BeepBeep, SENSYS '07 Proceedings of the 5th ACM Conference on Embedded Networked Sensor Systems: Sydney, Australia, Nov. 6-9, 2007, ACM, New York, NY, USA, Nov. 6, 2007 (Nov. 6, 2007), pp. 1-14; title, abstract, figure 3, sections 3.1, 4.1-4.3, 6.1, 7.

Jia, Ruoxi et al, Soundloc: Acoustic method for indoor localization without infrastructure; 2014.

First office action of Chinese application No. 201911129138.0 dated Oct. 28, 2021.

* cited by examiner

SPACE DIVISION METHOD AND APPARATUS, AND STORAGE MEDIUM

CROSS-REFERENCE TO RELATED APPLICATION

This application claims priority to Chinese Patent Application 201911129138.0 filed Nov. 18, 2019, the disclosure of which is hereby incorporated by reference in its entirety.

BACKGROUND

With constant developments of artificial intelligence (AI), more and more smart devices have been used in a home environment. It has been very common that multiple smart devices are present in the home environment.

SUMMARY

The present disclosure relates generally to the technical field of smart homes, and more specifically a space division method and apparatus, and a storage medium.

According to a first aspect of embodiments of the present disclosure, a space division method is provided. The method is executed by a sound collection device and includes:
receiving a first sound signal that is a medium-high frequency sound signal;
decoding the first sound signal by specified decoding to obtain device information of a sound source device that emits the first sound signal; and
generating space division information when the device information of the sound source device is successfully obtained, wherein the space division information is configured to indicate that the sound source device and the sound collection device are located in the same spatial region.

According to a second aspect of embodiments of the present disclosure, a space division method is provided. The method is executed by a server and includes:
receiving space division information sent by each sound collection device, wherein each space division information indicates a sound source device that is located in the same spatial region as the corresponding sound collection device, the sound collection device is served as a smart home device of a sound collector, and the sound source device is served as a smart home device of a sound source; and
performing statistics on the space division information sent by the each sound collection device to obtain at least one device group, wherein each device group includes the smart home devices located in the same spatial region.

According to a third aspect of embodiments of the present disclosure, a space division apparatus is provided. The apparatus is applied to a sound collection device and includes:
a processor; and
a memory device configured to store instructions executable by the processor, wherein
the processor is configured to:
receive a first sound signal that is a medium-high frequency sound signal;
decode the first sound signal by specified decoding to obtain device information of a sound source device that emits the first sound signal; and
generate space division information when the device information of the sound source device is successfully obtained, wherein the space division information is configured to indicate that the sound source device and the sound collection device are located in the same spatial region.

According to a fourth aspect of embodiments of the present disclosure, a space division apparatus is provided. The apparatus includes:
a processor; and
a memory device configured to store instructions executable by the processor, wherein
the processor is configured to:
receive space division information sent by each sound collection device, wherein each space division information indicates a sound source device that is located in the same spatial region as the corresponding sound collection device, the sound collection device is served as a smart home device of a sound collector, and the sound source device is served as a smart home device of a sound source; and
perform statistics on the space division information sent by the each sound collection device to obtain at least one device group, wherein each device group includes the smart home devices located in the same spatial region.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

DETAILED DESCRIPTION

Figure 1:
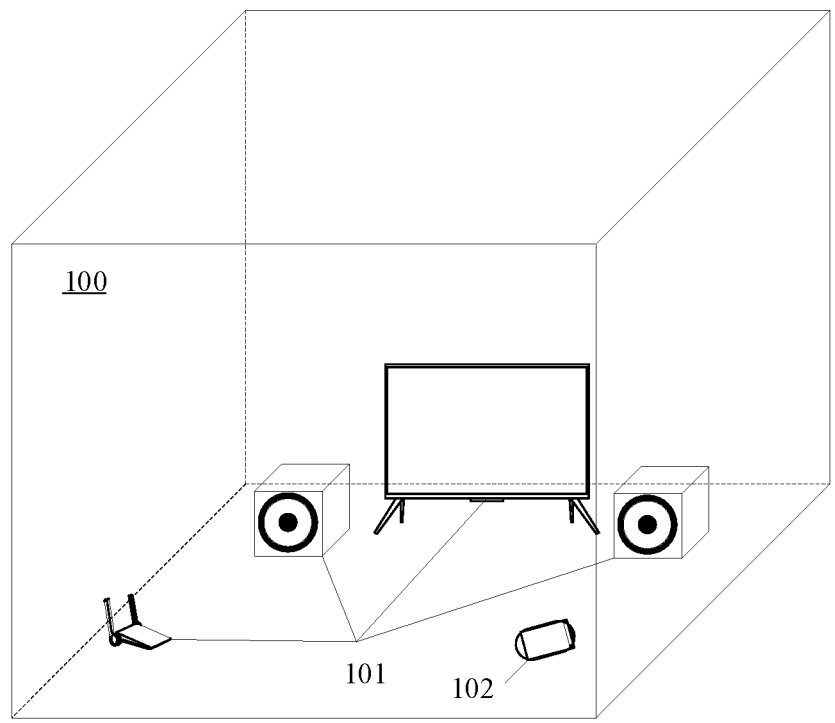
FIG. 1 is a schematic diagram showing spatial arrangement of an application scenario of a smart home device in accordance with some embodiments.

Reference will now be made in detail to exemplary embodiments, examples of which are illustrated in the accompanying drawings. Where the following description hereinafter refers to the accompanying drawings, the same reference numerals in different drawings represent the same or similar elements, unless otherwise represented. The implementations set forth in the following description of exemplary embodiments do not represent all implementations consistent with the present disclosure. Instead, these implementations are merely examples of devices and methods consistent with aspects related to the invention/disclosure as recited in the appended claims.

It should be understood that the term "several" used in this text means one or more, and the term "a plurality of" means two or more than two. The term "and/or" is merely an association relationship for describing associated objects, which represents that there may exist three types of relationships, for example, A and/or B may represent three situations: only A exists, both A and B exist, and only B exists. In addition, the character "/" herein generally represents an "or" relationship between associated objects before and after the character.

Smart home application scenarios described in the embodiments of the present disclosure are for the purpose of more clearly illustrating the technical solutions of the embodiments of the present disclosure, and do not constitute a limitation to the technical solutions provided by the embodiments of the present disclosure. It can be known by those of ordinary skill in the art that with the emergence of new smart home devices, the technical solutions provided by the embodiments of the present disclosure are also adapted to similar technical problems.

In order to facilitate understandings, some terms and application scenarios involved in the embodiments of the present disclosure are briefly introduced below.

Room Impulse Response (RIR): in room acoustics, an impulse response function of a system impulse in a room is called room impulse response. For the same room, an impulse response from a sound source to a receiving point is unique and contains all acoustic characteristics of an indoor sound field.

Direct Sound: a sound signal that is emitted from the sound source, and directly reaches the receiving point without any reflection.

Reflect Sound: a sound that is emitted from the sound source is reflected by an indoor wall, a ceiling, or a floor, and then reaches the receiving point. Generally, reflect sound that is at most 50 ms later than direct sound belongs to early reflect sound.

Reverberation: a multiple reflect sound that is emitted from the sound source and is at least 50 ms later than direct sound, is called reverberation.

Reverberation Time: a time required for a sound energy density of emitted sound signal is reduced to $1/(10^6)$ of a sound energy density of the sound signal emitted from a sound source after the sound source stops emitting sound, or a time required for a sound pressure level of the emitted sound signal to decay by 60 decibels.

To provide different home environments with personalized services, space division of the home environment can be detected.

FIG. 1 is a schematic diagram showing spatial arrangement of an application scenario of a smart home device in accordance with some embodiments. As shown in FIG. 1, a room 100 includes a plurality of smart home devices 101.

The smart home device 101 is a home device having a playback function and/or a pickup function. For example, the smart home device 101 may include, but not limited to, such devices that are fixedly mounted or movable within a small range as a smart TV, a smart robot, a smart speaker, a smart refrigerator, a smart air conditioner, a smart rice cooker, a smart sensor (e.g., an infrared sensor, a light sensor, a vibration sensor and a sound sensor) and a smart water purifier. Alternatively, the smart home device 101 may also be a mobile device, e.g., a Moving Picture Experts Group Audio Layer III (MP3) player, a Moving Picture Experts Group Audio Layer IV (MP4) player or a smart Bluetooth headset.

In some embodiments, the smart home devices may also be connected over a wired network or wireless network. In some embodiments, the wireless network or wired network uses standard communication technologies and/or protocols. The network is usually the Internet, but it may also be any network, including but not limited to any combination of a local area network (LAN), a metropolitan area network (MAN), a wide area network (WAN), a mobile, wired or wireless network, a dedicated network, or a virtual dedicated network. In some embodiments, technologies and/or formats including the Hypertext Mark-up Language (HTML), the Extensible Markup Language (XML), and the like are used to represent data exchanged over a network. In addition, conventional encryption technologies such as Secure Socket Layer (SSL), Transport Layer Security (TLS), Virtual Private Network (VPN), Internet Protocol Security (IPsec) and the like may be used to encrypt all or some links. In other embodiments, customized and/or dedicated data communication technologies may also be used in place of or in addition to the above data communication technologies.

In some embodiments, the room 100 may further include one or more control devices 102. The control device 102 may be connected to the smart home device 101 over the aforementioned wired network or wireless network. By controlling the control device 102, a user can make the corresponding smart home devices perform corresponding operations. In some embodiments, the control device 102 may be a smart terminal. In some embodiments, the smart terminal may be a smartphone, a tablet computer, an e-book reader, smart glasses, a smartwatch or the like. For example, the user can control a device A in the smart home device to send data or a signal to a device B by the smartphone, or the user can control the temperature of the smart refrigerator in the smart home devices by the smartphone.

In some embodiments, one or more devices in the above smart home devices 101 may also be served as the control device 102.

In some cases, space division of different rooms can be accomplished by calculating impulses of the rooms when necessary. For example, a measuring device having a sending terminal and a receiving terminal may be used to calculate impulse response of each room. Due to the specificity of a building structure, a furniture placement and the like of each room, such specific phenomena as reflection, diffraction, scattering can be caused to transmission of sound. These specific reflection, diffraction and scattering phenomena are represented as the impulse response of each room. For example, the measuring device having a speaker (the sending terminal) and a microphone (the receiving terminal) is used as a sound source. After a sound signal is emitted by the sending terminal, the receiving terminal of the measuring device can receive the sound signal that emitted from itself. The sound signal received by the receiving terminal of the measuring device includes not only a sound signal (direct sound) directly transmitted to the receiving terminal by the sound source (the sending terminal) that emits the sound signal of the measuring device by itself, but also the sound signal (reflect sound) formed by the reflection of the sound signal emitted from the measuring device itself on a room wall, a ceiling and other articles. Therefore, the sound signal received by the receiving terminal of the measuring device is formed by superimposing the direct sound and the reflect sound of the original sound signal emitted by the sending terminal of the measuring device. The reflect sound can reflect the size and reflection characteristics of the room in which the measuring device is located. Since the reflection characteristics of the room generally do not change, that is, the sound signal received by the receiving terminal may be regarded as a sound signal obtained by convolving a direct sound signal with the room impulse response (RIR) in a time domain. Therefore, the reverberation time of the room can be further determined by obtaining RIR of the room, and the size of a spatial region where the measuring device is located can be inferred based on the reverberation time of the room, so that the space division of the different rooms is realized.

In some embodiments, a relational expression between the sound signal that is emitted by the sending terminal and received by the receiving terminal of the measuring device having the speaker and the microphone, and the RIR, may be as shown in formula (1):

$$h(k)=R_y(k)=E[y(n)y^*(n-k)], \qquad (1)$$

in which h(k) is a time domain representation of RIR; k is an offset in the time domain; Ry(k) is an autocorrelation function of the sound signal that is emitted from the sending terminal, received by the receiving terminal of the measuring device; E represents normalized energy of the received signal; y(n) is the sound signal that is emitted from the sending terminal, received by the receiving terminal of the measuring device; and n is the nth moment at which the sound signal is played.

The measuring device can obtain the above formula (1) based on the received sound signal, and deconvolve it to obtain the expression of an attenuation curve of the normalized energy E, as shown in formula (2):

$$E(t)=G\int_t^\infty h^2(t)dt, \qquad (2)$$

in which G is a constant relevant to the degree of impulse excitation, t is a time of the corresponding received sound signal, and E(t) is the normalized energy.

Figure 2:
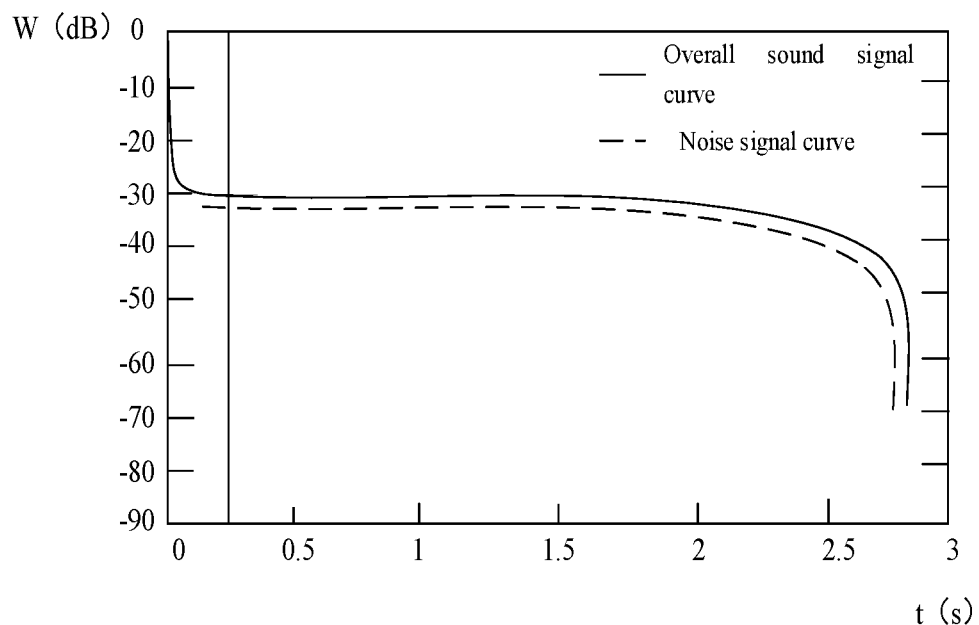
FIG. 2 is a schematic diagram showing that energy of a sound signal changes over time in accordance with some embodiments of the present disclosure.

The measuring device can further obtain an intensity of the sound signal received at each corresponding time by the above formula (2). Referring to FIG. 2, which is a schematic diagram related to formula (2) showing that energy of a sound signal changes over time in accordance with some embodiments of the present disclosure. As shown in FIG. 2, the horizontal axis represents time t(s), and the vertical axis represents normalized energy E(dB), namely, corresponding to the intensity of the received sound signal.

Generally, a developer can set an attenuation range of the normalized energy in the measuring device by experience, such that the measuring device can select and determine data of the normalized energy, and then work out the room reverberation time. For example: signal attenuation time within the intensity of the sound signal received at [−5 dB, −35 dB] is counted to further obtain the corresponding room reverberation time and to infer the size of the room, so as to accomplish space division of each space.

In the related art, the measuring device is used to collect its own playback signal to calculate the value of RIR in the room and estimate the size of the room, so as to accomplish space division of each space. The value of RIR or reverberation time in the rooms are similar when spatial arrangement and sizes of the two rooms are similar, or a noisy surrounding environment is large may affect a measured space division result, which leads to low accuracy of the space division result, etc.

In the technical solutions provided by the present disclosure, for the application scenarios of the smart home device, a space division method is provided, which can improve the accuracy of the space division result. The space division method involved in the embodiments of the present disclosure will be described in detail with reference to the accompanying drawings.

Figure 3:
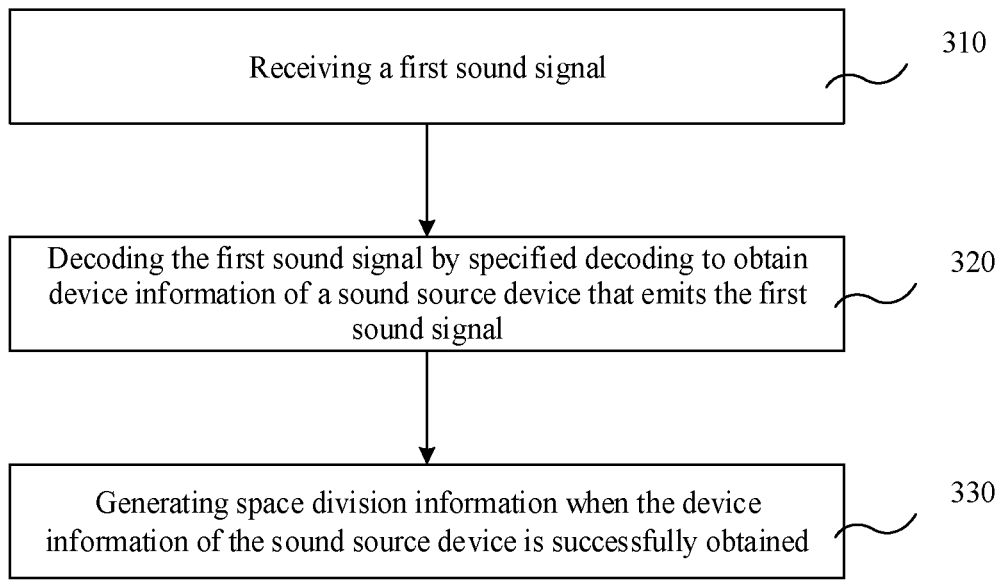
FIG. 3 is a flowchart of a space division method in accordance with some embodiments of the present disclosure.

Referring to FIG. 3, which is a flowchart of a space division method in accordance with some embodiments of the present disclosure. The method can be applied to the application scenario of the smart home device shown in FIG. 1 and is executed by a sound collection device that may be the smart home device in the above FIG. 1. As shown in FIG. 3, the method may include the following steps.

In step 310, a first sound signal that is a medium-high frequency sound signal is received.

The first sound signal may be a sound signal encoded with information of the smart home device in a smart home space. Alternatively, the first sound signal may also be a noise signal in the smart home space.

The above sound collection device may be a smart home device having a sound collection component. In some embodiments, the sound collection component may be an energy conversion device that can convert a sound signal into an electrical signal. For example, the sound collection component may be a microphone or a microphone array.

A frequency range of the sound signal can be divided into the following four frequency bands:

Low-frequency band: an audio frequency of 30 Hz to 150 Hz;

medium-low frequency band: an audio frequency of 150 Hz to 500 Hz;

medium-high frequency band: an audio frequency of 500 Hz to 5,000 Hz; and high-frequency band: an audio frequency of 5,000 kHz to 20 kHz.

In the present embodiment, the frequency range of the first sound signal is at the medium-high frequency band. That is, the audio frequency range of the first sound signal is 500 Hz to 5,000 Hz. The transmission speed of the sound signal in the air is a fixed value of 340 m/s based on the following formula:

$$v=\lambda \times f.$$

In the above formula, v is the wave speed of the sound signal, λ is the wavelength of the sound signal, and f is the frequency of the sound signal. As can be seen from the above formula, since the sound signal is transmitted at a fixed speed in the air under standard conditions, and the higher the frequency of the sound signal is, the shorter the wavelength of the sound signal is, correspondingly, the shorter the propagation distance of the sound signal is, the weaker the penetrability is. It thus can be seen that the medium-high frequency sound signal has strong physical barrier properties, and its transmission may be easily blocked by a wall or the like in the application scenario of the smart home device. Therefore, the use of the medium-high frequency sound signal can effectively reduce ineffective transmission and adverse effects on detection of the smart devices in other spaces (for example, other rooms), and can also avoid interference caused by the medium-high frequency sound signals emitted by the smart devices in other spaces.

In step 320, the first sound signal is decoded by specified decoding to obtain device information of a sound source device that emits the first sound signal.

In a possible case, the sound collection device decodes the first sound signal when the first sound signal is decoded by specified decoding to obtain, from the first sound signal, a character bit that represents the device information of the sound source device and is carried in the first sound signal. Information in the character bit, which represents the device information of the sound source device and is carried in the first sound signal, is acquired as the device information of the sound source device of the first sound signal.

The above-mentioned sound source device may be a smart home device having a sound transmitting component. In some embodiments, the sound transmitting component is an energy conversion device capable of converting an electrical signal into a sound signal. For example, the sound transmitting component may be a speaker or a speaker array.

In step 330, space division information is generated when the device information of the sound source device is successfully obtained. The space division information is configured to indicate that the sound source device and the sound collection device are located in the same spatial region.

The device information of the sound source device may include such information as a unique identifier of the sound source device.

In some embodiments, decoding the first sound signal by specified decoding to obtain the device information of the sound source device that emits the first sound signal includes:

decoding the first sound signal by specified decoding to obtain first decoding information; and acquiring device information that meets a specified format in the first decoding information.

In some embodiments, decoding the first sound signal by specified decoding to obtain the device information of the sound source device that emits the first sound signal includes:

decoding, when an intensity of the first sound signal is greater than a specified intensity threshold, the first sound signal by specified decoding to obtain the device information of the sound source device that emits the first sound signal.

In some embodiments, before receiving the first sound signal, the method further includes:

receiving a second sound signal;

decoding the second sound signal by specified decoding to obtain second decoding information; and continuing to receive the first sound signal, when the second decoding information includes header information.

In some embodiments, the method further includes:

emitting a third sound signal by a speaker component in the sound collection device, wherein a code carried in the third sound signal has a character bit that represents device information of the sound collection device.

As such, according to the space division method provided by the present disclosure, the first sound signal that is the medium-high frequency sound signal is received and decoded to obtain the device information of the sound source device. The space division information is generated when the device information of the sound source device is successfully obtained so as to indicate that the sound source device and the sound collection device are located in the same spatial region. In this solution, it can be confirmed that the sound collection device and the sound source device are located in the same spatial region, when the sound collection device successfully decodes the device information of the sound source device from the medium-high frequency sound signal with weaker penetrability. In this process, the device information is transmitted at medium and high frequencies, such that influences from noise in a background environment are reduced, and the accuracy of a space division result is improved.

Figure 4:
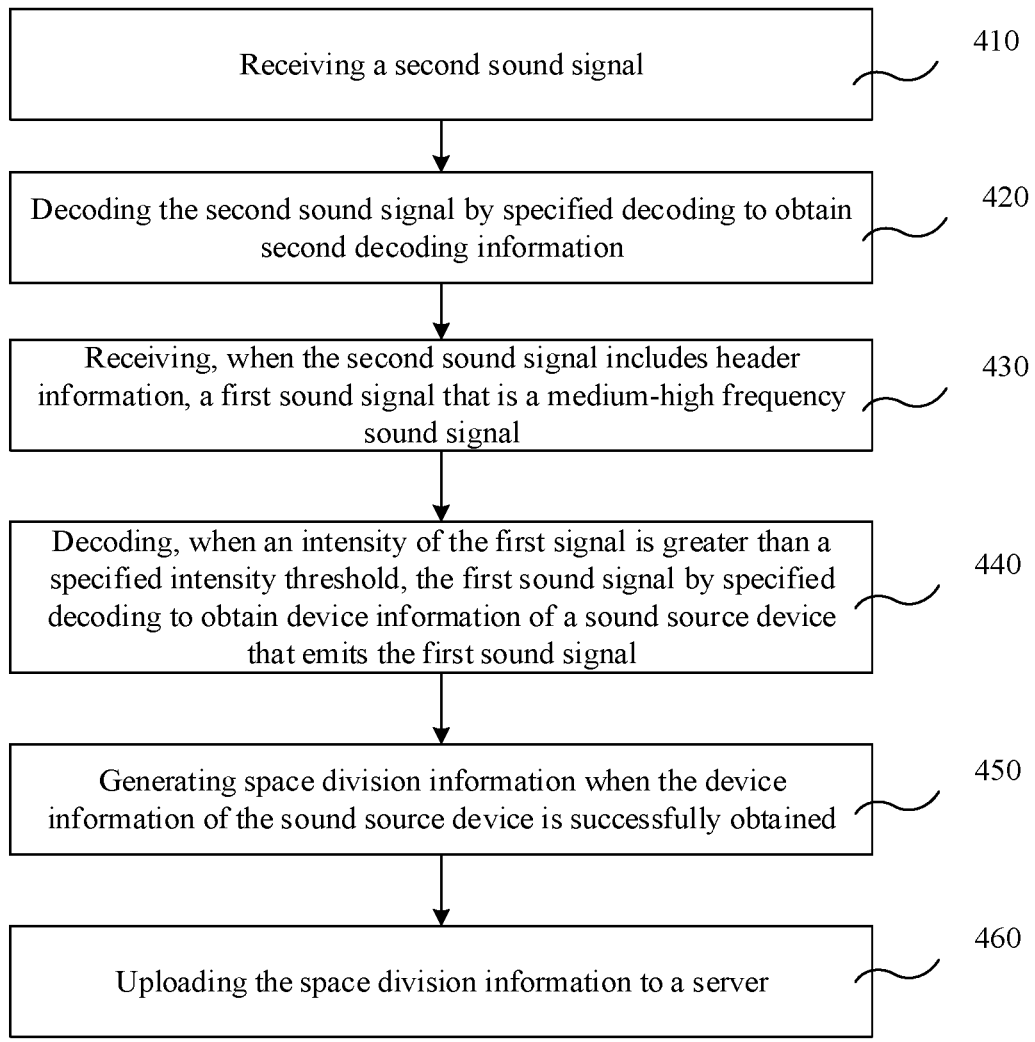
FIG. 4 is a flowchart of a space division method in accordance with some embodiments of the present disclosure.

Referring to FIG. 4, which is a flowchart of a space division method in accordance with some embodiments of the present disclosure. The method can be applied to the application scenario of the smart home device shown in FIG. 1. The method is executed by a sound collection device that may be the smart home device in the above FIG. 1. The method may include the following steps.

In step 410, a second sound signal is received.

In the present embodiment, in order to reduce unnecessary decoding operations of the sound collection device and improve the decoding accuracy of the sound collection device, a sound source device can send header information by a medium-high frequency sound signal, before sending a first sound signal encoded with device information of the sound source device, to trigger the sound collection device to decode the medium-high frequency sound signal after the header information.

Correspondingly, the sound collection device can continuously collect a sound signal and take the collected sound signal as the second sound signal when in operation.

The above second sound signal may be a sound signal at a specified frequency. That is, the sound source device sends the header information by the sound signal at a certain specified frequency when sending the header information. Correspondingly, the sound collection device also takes the sound signal received at the specified frequency as the second sound signal that may carry the header information.

In step 420, the second sound signal is decoded by specified decoding to obtain second decoding information.

In some embodiments, an encoding scheme corresponding to the specified decoding scheme is a frequency-shift keying (FSK) encoding scheme.

Figure 5:
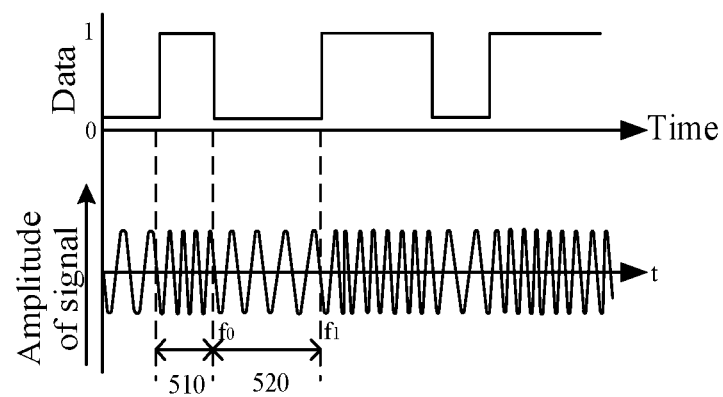
FIG. 5 is a schematic diagram of an FSK encoding scheme in accordance with some embodiments of the present disclosure.

FSK is a modulation mode that uses a digital signal to control changes of a carrier frequency, and two different frequencies near the carrier frequency are used to represent two binary values. Referring to FIG. 5, which is a schematic diagram showing an FSK encoding scheme in accordance with some embodiments of the present disclosure. As shown in FIG. 5, a frequency shown in an interval 510 is f0, which is used to represent 1 in a binary system, and a frequency shown in the interval 520 is f1, which is used to represent 0 in the binary system, such that different time frequencies can be combined to achieve combination of binary digits.

In a possible case, in order to improve the transmission efficiency, four bits of data are transmitted per frame. For example, one 0 is one bit of data, and one 1 is also one bit of data. Transmission of four bits of data in one frame may illustrate that 0000 or 1111 is transmitted in one frame. In this process, it is necessary to set $2\alpha=16$ frequencies in total. The following table shows the frequency corresponding to each information:

TABLE 1

| Four Bits of Data | Frequency/Hz |
|---|---|
| 0000 | 12937.5 |
| 0001 | 13125 |
| 0010 | 13312.5 |
| 0011 | 13500 |
| 0100 | 13687.5 |
| 0101 | 13875 |
| 0110 | 14062.5 |
| 0111 | 14250 |

TABLE 1-continued

| Four Bits of Data | Frequency/Hz |
| --- | --- |
| 1000 | 14437.5 |
| 1001 | 14625 |
| 1010 | 14812.5 |
| 1011 | 15000 |
| 1100 | 15187.5 |
| 1101 | 15375 |
| 1110 | 15562.5 |
| 1111 | 15750 |

Based on the information in the above table, FSK encryption of the first sound signal can be implemented. In a possible case, the second sound signal may be a data header formed by encryption of a plurality of frequency information. By identifying and analyzing the frequency information in the second sound signal and referring to the table above, specific data information of the data header formed by encryption of the plurality of frequency information carried in the second sound signal can be obtained when the second sound signal is collected by the sound collection device. For example, the second sound signal is a three-frame data header formed by encryption of three frequency information. It is determined that the sound signal including the three consecutive frequency information is the second sound signal when the sound collection device identifies and analyzes that a certain segment of the second sound signal contains consecutive frequency information of 12937.5 Hz, 13125 Hz, and 13312.5 Hz. Thus, the data header of 0000 0001 0010 may be obtained with reference to the above table.

In step 430, the first sound signal that is a medium-high frequency sound signal is received when the second decoding information includes header information.

In some embodiments, the header information refers to a data header formed by encryption of a plurality of pieces of frequency information. The plurality of pieces of frequency information have continuity.

In the present embodiment, it can be confirmed that there may be a first sound signal sent by a certain sound source device after the second sound signal, if the sound collection device parses out the header information from the second sound signal. At this time, the sound collection device may use the medium-high frequency sound signal collected after the second sound signal as the first sound signal.

In the solution of the present embodiment, when the sound collection device receives the first sound signal after the second sound signal, it is necessary to further confirm whether the first sound signal is a true signal sent by a certain sound source device, and it is also necessary to determine a device identity of the sound source device that sends the first sound signal. Therefore, the sound collection device needs to decode the first sound signal. A reference may be made to the follow-up steps for the decoding process.

In step 440, the first sound signal is decoded by specified decoding, when an intensity of the first sound signal is greater than a specified intensity threshold, to obtain the device information of the sound source device that emits the first sound signal.

In some embodiments, although the medium-high frequency sound signal has weak penetrability, obstacles (e.g., walls) between different spatial regions cannot ensure that the medium-high frequency sound signal is completely isolated. To avoid interference from the sound source devices in the different spatial regions, the sound collection device performs spectrum analysis on the obtained first sound signal before decoding the first sound signal collected in real-time. Whether the first sound signal has data information at a certain sound frequency is determined by setting an intensity threshold of the sound signal. It is determined that there is data information at the sound frequency when the intensity of the first sound signal at a certain sound frequency is greater than the intensity threshold, and then, the data information at the sound frequency is decoded by specified decoding.

In some embodiments, if there is a plurality of sound frequencies in one frame of the first sound signal, and the intensities of the sound signals at the plurality of sound frequencies are all greater than the intensity threshold, the sound frequency where the maximum sound intensity of the sound signals at the plurality of sound frequencies is acquired as a frequency of the sound signal in this frame, and the data information at this frequency is decoded by specified decoding.

In a possible case, the intensity threshold of the sound signal may be set to −55 dB. The sound collection device determines that a data signal exists in the sound signal at this frequency, and decodes the data information of the sound signal at this frequency by specified decoding, when the intensity of the sound signal at a certain frequency, namely, the loudness of the sound signal, is manifested in that the amplitude of the sound signal is greater than −55 dB.

In some embodiments, the above step 440 may include the following sub-steps:

(1) decoding the first sound signal by specified decoding to obtain first decoding information; and (2) acquiring device information that meets a specified format in the first decoding information.

To facilitate the sound collection device to parse the device information, in the present embodiment, the device information may be organized in a specified format and encoded onto the first sound signal when the sound source device encodes its own device information in the first sound signal. Correspondingly, the sound collection device can query whether there is information that meets the specified format in the information obtained by decoding, when decoding the first sound signal. If there is information that meets the specified format, the information that meets the specified format is acquired as the device information of the sound source device.

In some embodiments, the cause may be that the first sound signal is interfered by other co-frequency signals or the first sound signal is not a signal sent by the sound source device, if no information meets the specified format in the decoded information. At this time, the sound collection device can determine that the decoding fails, and continues to collect subsequent sound signals.

In some embodiments, an encoding scheme corresponding to the specified decoding scheme is the FSK encoding scheme.

In step 450, space division information is generated when the device information of the sound source device is successfully obtained. The space division information is configured to indicate that the sound source device and the sound collection device are located in the same spatial region.

Due to strong physical barrier properties of the medium-high frequency sound signal, transmission of the sound signal is easily blocked by such obstacles as walls in a smart home space. Therefore, the sound collection device that is not located in the same spatial region as the sound source device may not receive the sound signal sent by the sound source device. Thus, when the sound collection device successfully obtains the device information of the sound source device, it indicates that the sound source device and the sound collection device are located in the same spatial region. At this time, the sound collection device may generate a piece of space division information. For example, the space division information may include the device information of the sound source device, and the device information of the sound source device may be represented as a device identifier of the sound source device.

In step 460, the space division information is uploaded to a server.

The application scenario of the smart home device shown in FIG. 1 includes a plurality of smart home devices. In some embodiments, each smart home device is configured with a sound source device and a sound collection device. Each device may identify, by the method showing in the above steps 410 to 450, devices that are located in the same spatial region as itself to accomplish space division.

A cloud server can perform statistics on the space division information obtained by the smart home devices when each smart home device uploads its obtained space division information to the cloud server over a wireless network, thereby realizing space division of an overall smart home environment.

In some embodiments, a speaker component in the sound collection device may emit a third sound signal, and a code carried in the third sound signal includes a character bit that represents device information of the sound collection device. At this time, the sound collection device may be served as a sound source device, and other sound collection devices may receive the third sound signal and determine that they are in the same spatial region. In some embodiments, the speaker component in the sound collection device may also emit a fourth sound signal before emitting the third sound signal. The third sound signal is connected to the fourth sound signal. The fourth sound signal is configured to instruct the sound collection device that receives the fourth sound signal and the third sound signal to decode the third sound signal.

Figure 6:
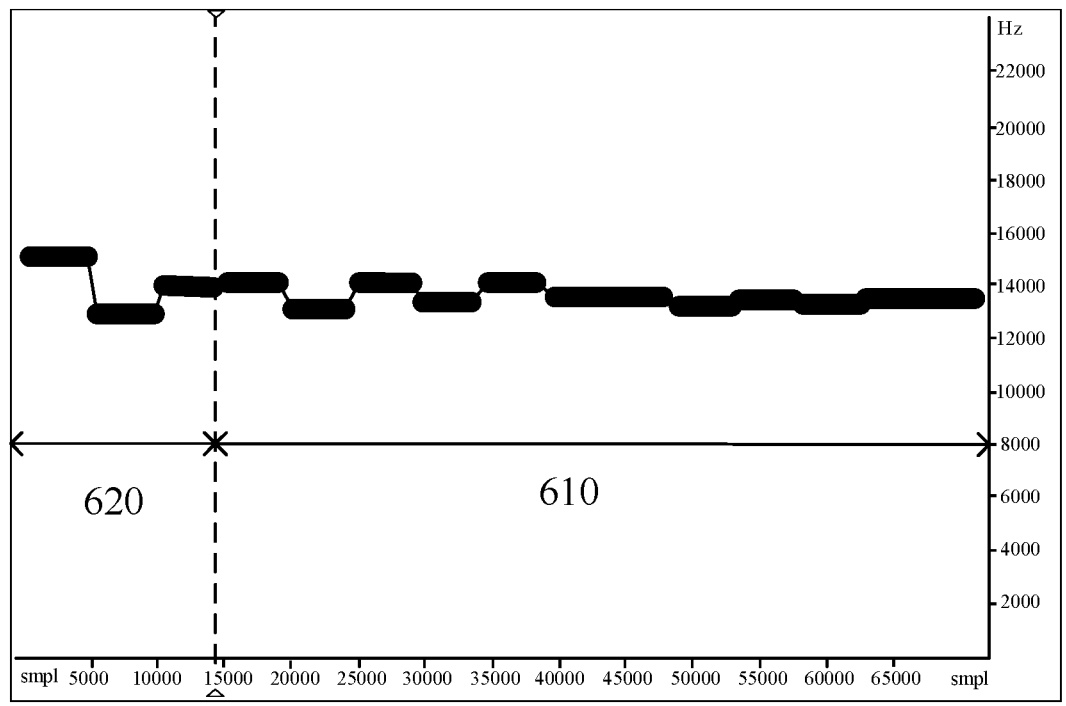
FIG. 6 is a spectrogram of a sound signal in accordance with some embodiments of the present disclosure.

In a possible case, the information of the sound source device, carried in the first sound signal emitted by the sound source device include the name "abc" of the sound source device and a message "123" sent to other smart home devices in the spatial region. The message sent to other smart home devices in the spatial region may be regarded as format information added into the first sound signal by the sound source device. Then the first sound signal emitted by the sound source device through the sending terminal is "abc123." The sound source device converts "abc123" into a binary signal with reference to the American Standard Code for Information Interchange (ASCII), namely, "0110 0001, 0110 0010, 0110 0011, 0011 0001, 0011 0010, 00110011." Taking every four bits as one frame, it is converted into decimals of 6, 1, 6, 2, 6, 3, 3, 1, 3, 2, 3, 3. By the FSK encoding scheme, the binary signal is converted into a frequency signal. With reference to the corresponding relationship between the four bits and the frequency shown in the above Table 1, the frequencies of information frames corresponding to the above first sound signal are "14062.5 Hz, 13125 Hz, 14062.5 Hz, 13312.5 Hz, 14062.5 Hz, 13500 Hz, 13500 Hz, 13125 Hz, 13500 Hz, 13312.5 Hz, 13500 Hz and 13500 Hz" in sequential order, so as to obtain the spectrogram of the sound signal. Referring to FIG. 6, which is a spectrogram of a sound signal in accordance with some embodiments of the present disclosure. As shown in FIG. 6, the first three frames of the spectrogram of the sound signal are a second sound signal 620, which is a fixed data header to trigger the sound collection device to decode a first sound signal 610 after header information. The first sound signal 610 and the second sound signal 620 are consecutive. The sound source device plays the second sound signal 620 and the first sound signal 610 by the sending terminal. The sending terminal may be a speaker, a speaker array or the like.

Figure 7:
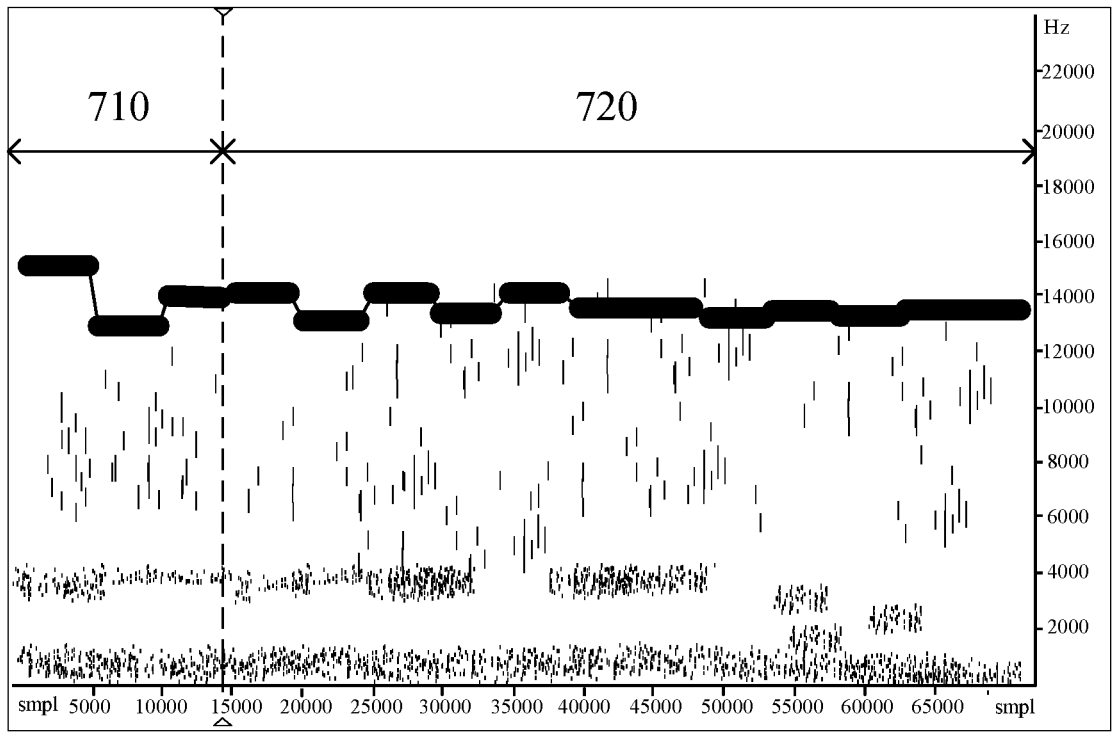
FIG. 7 is a spectrogram of a sound signal received by a sound collection device in accordance with some embodiments of the present disclosure.

The sound collection device receives a sound signal in a space by the receiving terminal. The receiving terminal may be a microphone, a microphone array or the like. Referring to FIG. 7, which is a spectrogram of a sound signal received by a sound collection device in accordance with an example of the present disclosure. As shown in FIG. 7, when the sound collection device collects the sound signal emitted by the sound source device, the spectrogram of the sound signal received by the sound collection device includes not only a first sound signal 710 and a second sound signal 720 that are emitted by the sound source device, but also a noise signal in an actual environment. Since frequencies of the noise signal are mainly at medium and low frequencies, the first sound signal and the second sound signal that use medium and high frequencies can effectively avoid noise interference.

The sound collection device decodes the second sound signal 720 by specified decoding to obtain second decoding information. The first sound signal 710 is received when the second decoding information includes header information.

To further avoid interference from sound source devices in different spatial regions, the sound collection device performs spectrum analysis on the obtained first sound signal 710 before decoding the collected first sound signal 710. When a sound intensity of the first sound signal 710 at a certain sound frequency is greater than a preset intensity threshold, taking an intensity threshold is −55 dB as an example, it is determined that there is data information at this sound frequency when the sound intensity of the first sound signal 710 at a certain sound frequency is greater than −55 dB. When there is a plurality of sound frequencies, of which the sound intensities are greater than the intensity threshold, in a certain frame of the first sound signal 710, the sound frequency where the maximum sound intensity of the sound signals at the plurality of sound signals is acquired as a sound frequency of the sound signal in this frame.

The sound collection device decodes the first sound signal 710. When the first sound signal 710 collected by the sound collection device is the first sound signal 610 emitted by the sound source device in FIG. 6, by acquiring the sound frequency on each frame of the first sound signal 710 and referring to the relationship between four bits data and the frequency in Table 1 and ASCII, the first sound signal is decoded to obtain information "abc123" emitted by the sound source device and to obtain the name "abc" and the format information "123" of the sound source device from "abc123." It can be determined that the sound source device and the sound collection device are located in the same room when the sound collection device successfully obtains the name of the sound source device. At this time, a piece of space division information including the device name "abc" of the sound source device can be generated.

As such, according to the space division method provided by the present disclosure, the first sound signal that is the medium-high frequency sound signal is received and decoded to obtain the device information of the sound source device. The space division information is generated when the device information of the sound source device is successfully obtained so as to indicate that the sound source device and the sound collection device are located in the same spatial region. In this solution, it can be confirmed that the sound collection device and the sound source device are located in the same spatial region when the sound collection device successfully decodes the device information of the sound source device from the medium-high frequency sound signal with weaker penetrability. In this process, the device information is transmitted at medium and high frequencies, such that influences from noise in a background environment are reduced, and the accuracy of a space division result is improved.

Figure 8:
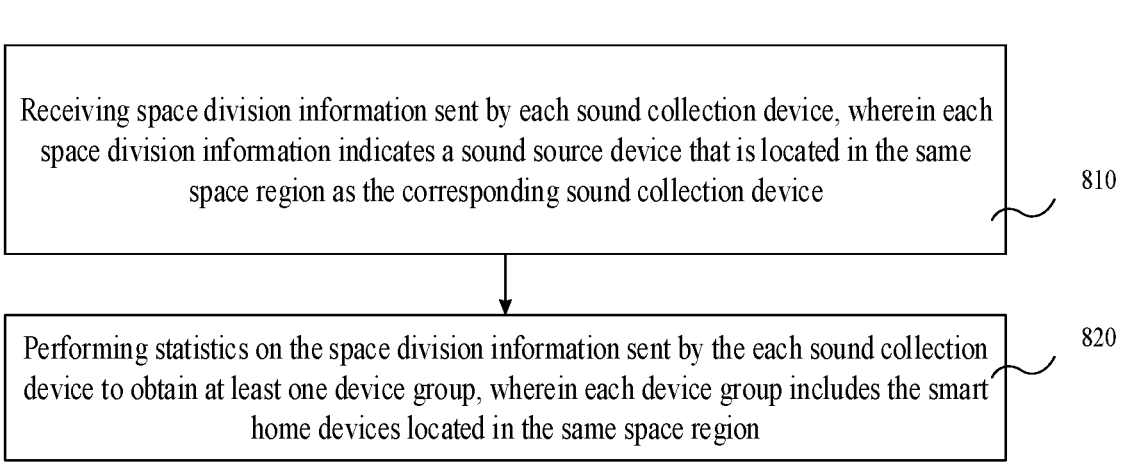
FIG. 8 is a flowchart of a space division method in accordance with some embodiments of the present disclosure.

Referring to FIG. 8, which is a flowchart of a space division method in accordance with some embodiments of the present disclosure. The method may be applied to the application scenario of the smart home device shown in FIG. 1. The method is executed by a server and includes the following steps.

In step 810, space division information sent by each sound collection device is received. Each space division information indicates a sound source device that is located in the same spatial region as the corresponding sound collection device. The sound collection device is served as a smart home device of a sound collector. The sound source device is served as a smart home device of a sound source.

The space division information sent by each sound collection device and received by the server is the space division information generated by each sound collection device in all or part of the steps in the space division method shown in FIG. 3 or FIG. 4, and is configured to indicate the sound source device that is located in the same spatial region as the corresponding sound collection device.

In step 820, statistics is performed on the space division information sent by the each sound collection device to obtain at least one device group. Each device group includes the smart home devices located in the same spatial region.

Information such as the types and the number of the smart home devices in the same spatial region can be obtained by performing statistics on the space division information sent by the each sound collection device. Thus, space division of an overall smart home environment is realized.

In a possible case, there are two spatial regions in a certain smart home environment. Taking that the spatial regions are two independent rooms as an example, different smart home devices are placed in the two rooms respectively. For example, a smart TV, a smart air conditioner, a smart speaker, etc. may be placed in a room A, and a smart refrigerator, a smart washing machine, etc. may be placed in a room B. The sound collection devices and sound source devices are disposed in the above-mentioned smart home devices. The smart home devices may adopt the space division method shown in FIG. 3 or FIG. 4 to obtain the space division information, and upload the obtained space division information to the server.

After receiving the space division information sent by the each sound collection device, the server performs statistics on the space division information sent by the each sound collection device. For the smart home devices in the room A, the space division information obtained by the smart TV may indicate that the smart air conditioner and the smart TV are located in the same room, or that the smart speaker and the smart TV are located in the same room. Similarly, the space division information obtained by the smart air conditioner may also indicate that the smart TV and the smart air conditioner are located in the same room, and the smart speaker and the smart air conditioner are located in the same room. The space division information obtained by the smart speaker may indicate that the smart air conditioner and the smart speaker are located in the same room, and may also indicate that the smart speaker and smart TV are in the same room. It can be known by statistics that the smart TV, the smart air conditioner, and the smart speaker are located in the same room after the server receives the space division information uploaded by the smart TV, the smart air conditioner and the smart speaker. Similarly, the server can determine that the smart refrigerator and the smart washing machine are located in the same room. In this way, space division of an overall smart home environment can be realized.

As such, according to the space division method provided by the present disclosure, the space division information sent by each sound collection device is received. Each space division information indicates the sound source device that is located in the same spatial region as the corresponding sound collection device. The space division information sent by the sound collection devices is performed statistics to obtain at least one device group. Each device group includes the smart home devices located in the same spatial region. Therefore, space division of an overall smart home environment is realized, and the accuracy of a space division result is improved.

Figure 9:
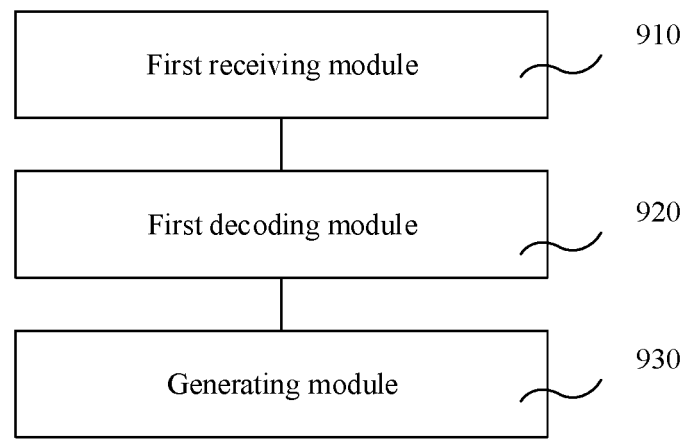
FIG. 9 is a block diagram of a space division apparatus in accordance with one exemplary embodiment of the present disclosure.

Referring to FIG. 9, which is a block diagram of a space division apparatus in accordance with one exemplary embodiment of the present disclosure. The space division apparatus is applied to a sound collection device to execute all or part of the steps of the method of any one of the embodiments shown in FIG. 3 or 4. The above-mentioned method may be applied to the application scenario of the smart home device shown in FIG. 1. As shown in FIG. 9, the space division apparatus may include:

a first receiving module 910, configured to receive a first sound signal that is a medium-high frequency sound signal;

a first decoding module 920, configured to decode the first sound signal by specified decoding to obtain device information of a sound source device that emits the first sound signal; and a generating module 930, configured to generate space division information when the device information of the sound source device is successfully obtained, wherein the space division information is configured to indicate that the sound source device and the sound collection device are located in the same spatial region.

In some embodiments, the first decoding module 920 includes:

a decoding sub-module configured to decode the first sound signal by specified decoding to obtain first decoding information; and an acquiring sub-module configured to acquire device information that meets a specified format in the first decoding information.

In some embodiments, the first decoding module 920 is configured to:

decode, when an intensity of the first sound signal is greater than a specified intensity threshold, the first sound signal by specified decoding to obtain the device information of the sound source device that emits the first sound signal.

In some embodiments, the apparatus further includes:

a second receiving module configured to receive a second sound signal; and a second decoding module configured to decode the second sound signal by specified decoding to obtain second decoding information.

The first decoding module 920 configured to continue to receive a first sound signal when the second decoding information includes header information.

In some embodiments, the apparatus further includes:

an emitting module configured to emit a third sound signal by a speaker component in the sound collection device, wherein a code carried in the third sound signal has a character bit that represents device information of the sound collection device.

As such, the space division apparatus provided by the present disclosure can execute the space division method. The first sound signal that is the medium-high frequency sound signal is received and decoded to obtain the device information of the sound source device. The space division information is generated when the device information of the sound source device is successfully obtained so as to indicate that the sound source device and the sound collection device are located in the same spatial region. In this solution, it can be confirmed that the sound collection device and the sound source device are located in the same spatial region when the sound collection device successfully decodes the device information of the sound source device from the medium-high frequency sound signal with weaker penetrability. In this process, the device information is transmitted at medium and high frequencies, such that influences from noise in a background environment are reduced, and the accuracy of a space division result is improved.

Figure 10:
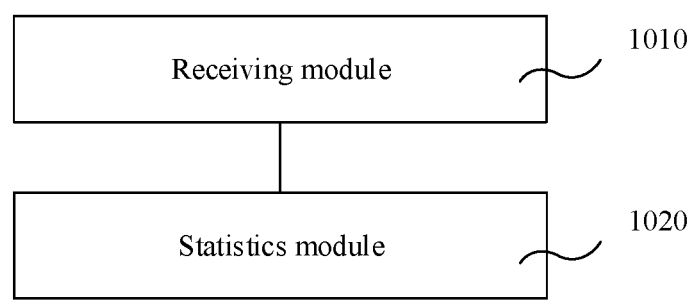
FIG. 10 is a block diagram of a space division apparatus in accordance with another exemplary embodiment of the present disclosure.

Referring to FIG. 10, which is a block diagram of a space division apparatus in accordance with some embodiments of the present disclosure. The space division apparatus is applied to a server to execute all or part of steps of the method of the embodiment shown in FIG. 8. The method may be applied to the application scenario of the smart home device shown in FIG. 1. As shown in FIG. 10, the space division apparatus may include:

a receiving module 1010, configured to receive space division information sent by each sound collection device, wherein each space division information indicates a sound source device that is located in the same spatial region as the corresponding sound collection device, the sound collection device is served as a smart home device of a sound collector, and the sound source device is served as a smart home device of a sound source; and a statistics module 1020, configured to perform statistics on the space division information sent by the each sound collection device to obtain at least one device group, wherein each device group includes the smart home devices located in the same spatial region.

As such, the space division apparatus provided by the present disclosure can execute the space division method. The space division information sent by each sound collection device is received. Each space division information indicates the sound source device that is located in the same spatial region as the corresponding sound collection device. The space division information sent by the sound collection devices is performed statistics to obtain at least one device group. Each device group includes the smart home devices located in the same spatial region. Therefore, space division of an overall smart home environment is realized, and the accuracy of a space division result is improved.

Some embodiments of the present disclosure provide a space division apparatus capable of implementing all or part of the steps of the method of any one of the embodiments shown in FIG. 3 or 4 of the present disclosure. The space division apparatus includes a processor and a memory device configured to store instructions executable by the processor.

The processor is configured to:

receive a first sound signal that is a medium-high frequency sound signal;

decode the first sound signal by specified decoding to obtain device information of a sound source device that emits the first sound signal; and generate space division information when the device information of the sound source device is successfully obtained, wherein the space division information is configured to indicate that the sound source device and the sound collection device are located in the same spatial region.

In some embodiments, decoding the first sound signal by specified decoding to obtain the device information of the sound source device that emits the first sound signal includes:

decoding the first sound signal by specified decoding to obtain first decoding information; and acquiring device information that meets a specified format in the first decoding information.

In some embodiments, decoding the first sound signal by specified decoding to obtain the device information of the sound source device that emits the first sound signal includes:

decoding, when an intensity of the first sound signal is greater than a specified intensity threshold, the first sound signal by specified decoding to obtain the device information of the sound source device that emits the first sound signal.

In some embodiments, before receiving the first sound signal, the method further includes:

receiving a second sound signal;

decoding the second sound signal by specified decoding to obtain second decoding information; and continuing to receive the first sound signal, when the second decoding information includes header information.

In some embodiments, the method further includes:

emitting a third sound signal by a speaker component in the sound collection device, wherein a code carried in the third sound signal has a character bit that represents device information of the sound collection device.

As such, the space division apparatus provided by the present disclosure can execute the space division method. The first sound signal that is the medium-high frequency sound signal is received and decoded to obtain device information of the sound source device. The space division information is generated when the device information of the sound source device is successfully obtained so as to indicate that the sound source device and the sound collection device are located in the same spatial region. In this solution, it can be confirmed that the sound collection device and the sound source device are located in the same spatial region when the sound collection device successfully decodes the device information of the sound source device from the medium-high frequency sound signal with weaker penetrability. In this process, the device information is transmitted at medium and high frequencies, such that influences from noise in a background environment are reduced, and the accuracy of a space division result is improved.

Some embodiments of the present disclosure provide a space division apparatus capable of implementing all or part of the steps of the method of any one of the embodiments shown in FIG. 8 of the present disclosure. The space division apparatus includes a processor and a memory device configured to store instructions executable by the processor.

The processor is configured to:

receive space division information sent by each sound collection device, wherein each space division information indicates a sound source device that is located in the same spatial region as the corresponding sound collection device, the sound collection device is served as a smart home device of a sound collector, and the sound source device is served as a smart home device of a sound source; and perform statistics on the space division information sent by the each sound collection device to obtain at least one device group, wherein each device group includes the smart home devices located in the same spatial region.

As such, the space division apparatus provided by the present disclosure can execute the space division method. The space division information sent by each sound collection device is received. Each space division information indicates the sound source device that is located in the same spatial region as the corresponding sound collection device. The space division information sent by the sound collection devices is performed statistics to obtain at least one device group. Each device group includes the smart home devices located in the same spatial region. Therefore, space division of an overall smart home environment is realized, and the accuracy of a space division result is improved.

Figure 11:
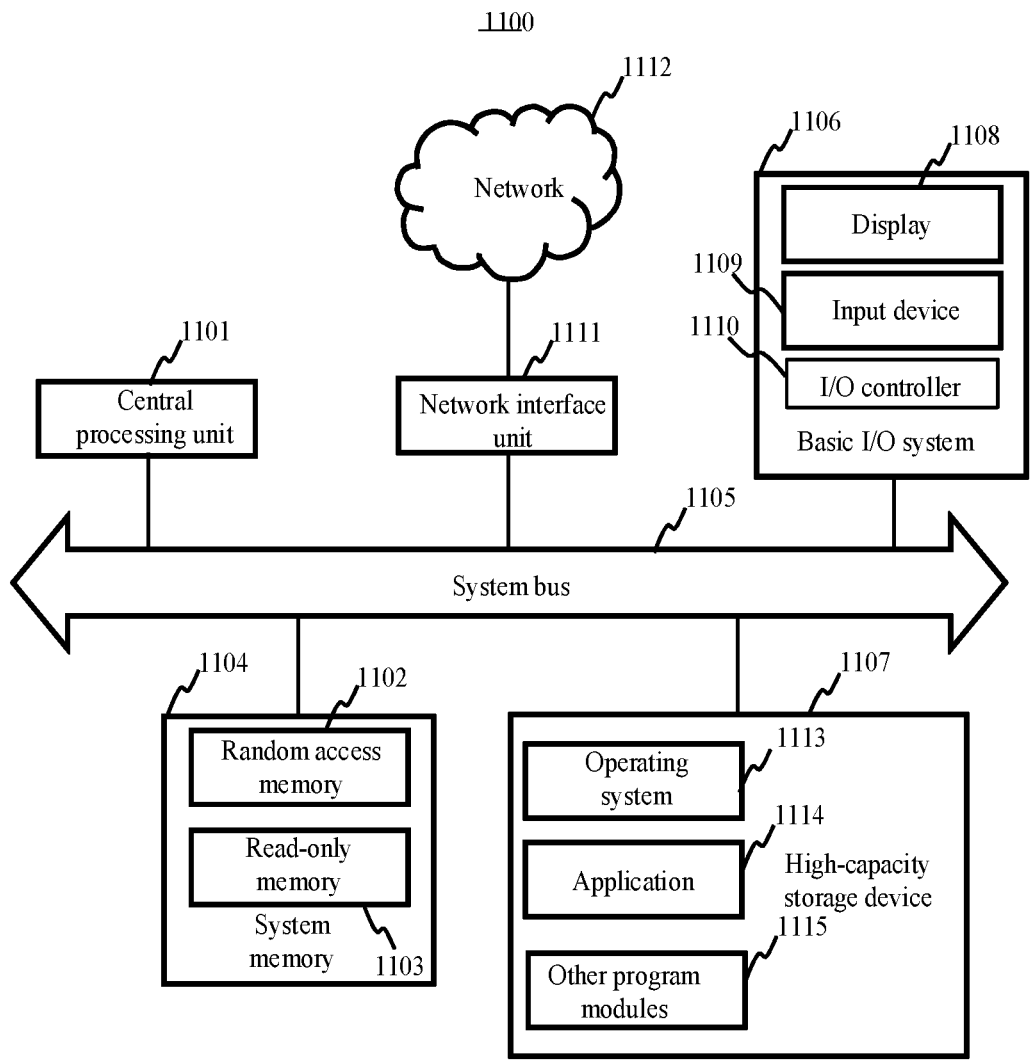
FIG. 11 is a structural block diagram of a computer device in accordance with some embodiments.

FIG. 11 is a structural block diagram of a computer apparatus 1100 in accordance with one exemplary embodiment. The computer apparatus may be implemented as the above-mentioned server in the foregoing solution of the present disclosure. The computer apparatus 1100 includes a central processing unit (CPU) 1101, a system memory 1104 including a random-access memory (RAM) 1102 and a read-only memory (ROM) 1103, and a system bus 1105 connecting the system memory 1104 and the CPU 1101. The computer apparatus 1100 further includes a basic input/output system (I/O system) 1106 which helps transmit information between various components within a computer, and a high-capacity storage device 1107 for storing an operating system 1113, an application 1114 and other program modules 1115.

The basic I/O system 1106 includes a display 1108 for displaying information and an input device 1109, such as a mouse and a keyboard, for a user to input the information. The display 1108 and the input device 1109 are both connected to the CPU 1101 by an I/O controller 1110 connected to the system bus 1105. The basic I/O system 1106 may also include the I/O controller 1110 for receiving and processing input from a plurality of other devices, such as a keyboard, a mouse and an electronic stylus. Similarly, the I/O controller 1110 further provides output to a display screen, a printer or other types of output devices.

The high-capacity storage device 1107 is connected to the CPU 1101 by a high-capacity storage controller (not shown) connected to the system bus 1105. The high-capacity storage device 1107 and its associated computer-readable medium provide non-volatile storage for the computer apparatus 1100. That is, the high-capacity storage device 1107 may include a computer-readable medium (not shown), such as a hard disk or a compact disc read-only memory (CD-ROM) drive.

Without loss of generality, the computer-readable medium may include a computer storage medium and a communication medium. The computer storage medium includes volatile and non-volatile, removable and non-removable media implemented in any method or technology for storing information such as a computer-readable instruction, a data structure, a program module or other data. The computer storage medium includes a RAM, a ROM, an EPROM, an erasable programmable read-only memory (EEPROM), a flash memory or other solid-state storage technologies; a CD-ROM, a digital versatile disc (DVD) or other optical storage; and a tape cartridge, a magnetic tape, a disk storage or other magnetic storage devices. Of course, it will be known by those skilled in the art that the computer storage medium is not limited to above. The above system memory 1104 and the high-capacity storage device 1107 may be collectively referred to as the memory.

According to various embodiments of the present disclosure, the computer apparatus 1100 may also be operated by a remote computer connected to a network through the network, such as the Internet. That is, the computer apparatus 1100 may be connected to the network 1112 through a network interface unit 1111 connected to the system bus 1105, or may be connected to other types of networks or remote computer systems (not shown) with the network interface unit 1111.

The memory device can have one or more programs stored thereon. The CPU 1101 implements all or part of the steps of the method shown in FIG. 4 or FIG. 8 by executing the one or more programs.

Some embodiments of the present disclosure also provide a computer-readable storage medium for storing computer software instructions used by the above computer apparatus. The computer software instructions include a program designed for executing the above space division method. For example, the computer-readable storage medium may be a ROM, a RAM, a CD-ROM, a magnetic tape, a floppy disk, an optical data storage device, or the like.

Figure 12:
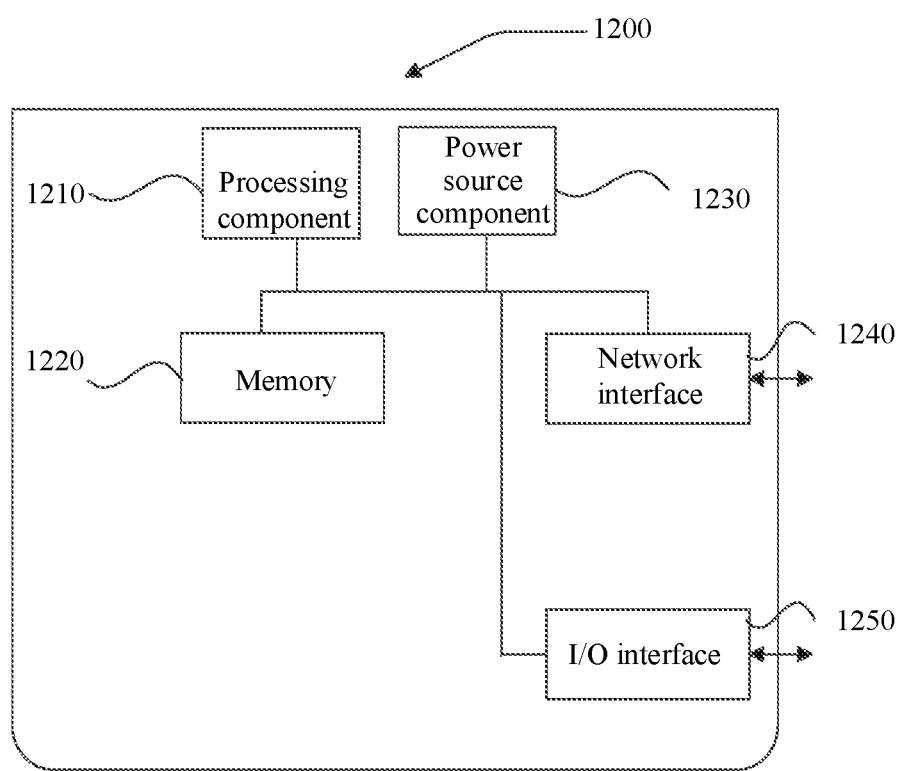
FIG. 12 is a block diagram of an apparatus applied to a smart home device in accordance with some embodiments.

FIG. 12 is a block diagram of an apparatus applied to a smart home device according to some embodiments of the present disclosure. For example, the apparatus 1200 may be provided as a smart home device involved in the above embodiments. Referring to FIG. 12, the apparatus 1200 includes a processing component 1210 which further includes one or more processors, and memory resources represented by a memory device 1220 for storing instructions executable by the processing component 1210, for example an application program. The application program stored in the memory device 1220 may include one or more modules, each of which corresponds to a set of instructions. Further, the processing component 1210 is configured to execute instructions to perform all or part of the steps of the above space division method executed by the smart home device.

The apparatus 1200 may also include a power source component 1230 configured to perform power source management of the apparatus 1200, a wired or wireless network interface 1240 configured to connect the apparatus 1200 to the network, and an input/output (I/O) interface 1250. The apparatus 1200 can operate an operating system stored in the memory device 1220, such as Windows Server™, Mac OS X™, Unix™, Linux™, FreeBSD™ or the like.

Some embodiments of the present disclosure further provide a non-transitory computer-readable storage medium. At least one instruction, at least one program, a code set or an instruction set is stored in the storage medium, and the at least one instruction, the at least one program, the code set or the instruction set is loaded and executed by a processor to implement all or part of the steps of the above space division method executed by the sound collection device.

It should be appreciated by those skilled in the art that in one or more of the above examples, the functions described in the embodiments of the present disclosure may be implemented in hardware, software, firmware or any combination thereof. When being implemented in the software, these functions may be stored in a computer-readable storage medium or transmitted as one or more instructions or codes on the computer-readable storage medium. The computer-readable storage medium includes a computer storage medium and a communication medium, wherein the communication medium includes any medium that facilitates the transmission of a computer program from one place to another. The storage medium may be any available medium accessible by a general or dedicated computer.

Some embodiments of the present disclosure further provide a computer-readable storage medium for storing computer software instructions used by the above sound collection device or server. The computer software instructions include a program designed for executing the above space division method.

In an aspect, a space division method is provided. The method is executed by a sound collection device and includes:

receiving a first sound signal that is a medium-high frequency sound signal;

decoding the first sound signal by specified decoding to obtain device information of a sound source device that emits the first sound signal; and generating space division information when the device information of the sound source device is successfully obtained, wherein the space division information is configured to indicate that the sound source device and the sound collection device are located in the same spatial region.

In some embodiments, decoding the first sound signal by specified decoding to obtain the device information of the sound source device that emits the first sound signal includes:

decoding the first sound signal by specified decoding to obtain first decoding information; and acquiring device information that meets a specified format in the first decoding information.

In some embodiments, decoding the first sound signal by specified decoding to obtain the device information of the sound source device that emits the first sound signal includes:

decoding, when an intensity of the first sound signal is greater than a specified intensity threshold, the first sound signal by specified decoding to obtain the device information of the sound source device that emits the first sound signal.

In some embodiments, before receiving the first sound signal, the method further includes:

receiving a second sound signal;

decoding the second sound signal by specified decoding to obtain second decoding information; and continuing to receive the first sound signal, when the second decoding information includes header information.

In some embodiments, the method further includes:

emitting a third sound signal by a speaker component in the sound collection device, wherein a code carried in the third sound signal has a character bit that represents device information of the sound collection device.

In another aspect, a space division method is provided. The method is executed by a server and includes:

receiving space division information sent by each sound collection device, wherein each space division information indicates a sound source device that is located in the same spatial region as the corresponding sound collection device, the sound collection device is served as a smart home device of a sound collector, and the sound source device is served as a smart home device of a sound source; and performing statistics on the space division information sent by the each sound collection device to obtain at least one device group, wherein each device group includes the smart home devices located in the same spatial region.

In another aspect, a space division apparatus is provided. The apparatus is applied to a sound collection device and includes:

a first receiving module configured to receive a first sound signal that is a medium-high frequency sound signal;

a first decoding module configured to decode the first sound signal by specified decoding to obtain device information of a sound source device that emits the first sound signal; and a generating module configured to generate space division information when the device information of the sound source device is successfully obtained, wherein the space division information is configured to indicate that the sound source device and the sound collection device are located in the same spatial region.

In some embodiments, the first decoding module includes:

a decoding sub-module configured to decode the first sound signal by specified decoding to obtain first decoding information; and an acquiring sub-module configured to acquire device information that meets a specified format in the first decoding information.

In some embodiments, the first decoding module is configured to:

decode, when an intensity of the first sound signal is greater than a specified intensity threshold, the first sound signal by specified decoding to obtain the device information of the sound source device that emits the first sound signal.

In some embodiments, the apparatus further includes:

a second receiving module configured to receive a second sound signal; and a second decoding module configured to decode the second sound signal by specified decoding to obtain second decoding information, wherein the first decoding module is configured to continue to receive the first sound signal, when the second decoding information includes header information.

In some embodiments, the apparatus further includes:

an emitting module configured to emit a third sound signal by a speaker component in the sound collection device, wherein a code carried in the third sound signal has a character bit that represents device information of the sound collection device.

In another aspect, a space division apparatus is provided. The apparatus includes:

a receiving module configured to receive space division information sent by each sound collection device, wherein each space division information indicates a sound source device that is located in the same spatial region as the corresponding sound collection device, the sound collection device is served as a smart home device of a sound collector, and the sound source device is served as a smart home device of a sound source; and a statistics module configured to perform statistics on the space division information sent by the each sound collection device to obtain at least one device group, wherein each device group includes the smart home devices located in the same spatial region.

In another aspect, a space division apparatus is provided. The apparatus is applied to a sound collection device and includes:

a processor; and a memory device configured to store instructions executable by the processor, wherein the processor is configured to:

receive a first sound signal that is a medium-high frequency sound signal;

decode the first sound signal by specified decoding to obtain device information of a sound source device that emits the first sound signal; and generate space division information when the device information of the sound source device is successfully obtained, wherein the space division information is configured to indicate that the sound source device and the sound collection device are located in the same spatial region.

A computer device includes a processor and a memory device. At least one instruction, at least one program, a code set or an instruction set is stored in the memory device, the at least one instruction, the at least one program, the code set or the instruction set is loaded and executed by the processor to implement the space division method as defined in the first aspect or any alternatives in the first aspect.

In another aspect, a space division apparatus is provided. The apparatus is applied to a server and includes:

a processor; and a memory device configured to store instructions executable by the processor, wherein the processor is configured to:

receive space division information sent by each sound collection device, wherein each space division information indicates a sound source device that is located in the same spatial region as the corresponding sound collection device, the sound collection device is served as a smart home device of a sound collector, and the sound source device is served as a smart home device of a sound source; and perform statistics on the space division information sent by the each sound collection devices to obtain at least one device group, wherein each device group includes the smart home devices located in the same spatial region.

In another aspect, a computer-readable storage medium is provided. At least one instruction, at least one program, a code set or an instruction set is stored in the storage medium and loaded, the at least one instruction, the at least one program, the code set or the instruction set is executed by a processor to implement the space division method as defined in the first aspect or the second aspect or any alternatives of the first aspect or any alternatives of the second aspect.

Various embodiments of the present disclosure can have one or more of the following advantages.

The first sound signal that is the medium-high frequency sound signal is received and decoded to obtain device information of the sound source device. The space division information is generated when the device information of the sound source device is successfully obtained, so as to indicate that the sound source device and the sound collection device are located in the same spatial region. In this solution, it can be confirmed that the sound collection device and the sound source device are located in the same spatial region, when the sound collection device successfully decodes the device information of the sound source device from the medium-high frequency sound signal with weaker penetrability. In this process, the device information is transmitted at medium and high frequencies, such that influences from noise in a background environment are reduced, and the accuracy of a space division result is improved.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A space division method, executed by a sound collection device and comprising:
   receiving a first sound signal that is a medium-high frequency sound signal;
   decoding the first sound signal by specified decoding to obtain device information of a sound source device that emits the first sound signal; and
   generating space division information upon that the device information of the sound source device is successfully obtained,
   wherein the space division information is configured to indicate that the sound source device and the sound collection device are located in a same spatial region, and
   wherein the decoding the first sound signal by specified decoding to obtain the device information of the sound source device that emits the first sound signal comprises:
   decoding, when an intensity of the first sound signal is greater than a specified intensity threshold, the first sound signal by specified decoding to obtain the device information of the sound source device that emits the first sound signal.

2. The method according to claim 1, wherein the decoding the first sound signal by specified decoding to obtain the device information of the sound source device that emits the first sound signal comprises:
   decoding the first sound signal by specified decoding to obtain first decoding information; and
   acquiring device information that meets a specified format in the first decoding information.

3. The method according to claim 1, prior to the receiving the first sound signal, further comprising:
   receiving a second sound signal;
   decoding the second sound signal by specified decoding to obtain second decoding information; and
   continuing to receive the first sound signal, when the second decoding information comprises header information.

4. The method according to claim 1, further comprising:
   emitting a third sound signal by a speaker component in the sound collection device, wherein a code carried in the third sound signal has a character bit that represents device information of the sound collection device.

5. The method according to claim 1, further comprising:
   uploading the space division information to a server.

6. The method according to claim 1, wherein the sound source device is a smart home device having a sound transmitting component.

7. The method according to claim 6, wherein the sound transmitting component is an energy conversion device configured to convert an electrical signal into a sound signal.

8. A space division method, executed by a server and comprising:
   receiving space division information sent by each sound collection device, wherein each space division information indicates a sound source device that is located in a same spatial region as the corresponding sound collection device, the sound collection device is served as a smart home device of a sound collector, and the sound source device is served as a smart home device of a sound source; and
   performing statistics on the space division information sent by the each sound collection device to obtain at least one device group, wherein each device group comprises the smart home devices located in the same spatial region.

9. A space division apparatus, applied to a sound collection device and comprising:
a processor; and
a memory device configured to store instructions executable by the processor, wherein
the processor is configured to:
receive a first sound signal that is a medium-high frequency sound signal;
decode the first sound signal by specified decoding to obtain device information of a sound source device that emits the first sound signal; and
generate space division information when the device information of the sound source device is successfully obtained, wherein the space division information is configured to indicate that the sound source device and the sound collection device are located in the same spatial region,
wherein in order to decode the first sound signal by specified decoding to obtain device information of a sound source device that emits the first sound signal, the processor is configured to:
decode, when an intensity of the first sound signal is greater than a specified intensity threshold, the first sound signal by specified decoding to obtain the device information of the sound source device that emits the first sound signal.

10. The apparatus according to claim 9, wherein in order to decode the first sound signal by specified decoding to obtain device information of a sound source device that emits the first sound signal, the processor is configured to:
decode the first sound signal by specified decoding to obtain first decoding information; and
acquire device information that meets a specified format in the first decoding information.

11. The apparatus according to claim 9, wherein the processor is further configured to:
receive a second sound signal; and
decode the second sound signal by specified decoding to obtain second decoding information, wherein
continue to receive the first sound signal, when the second decoding information comprises header information.

12. The apparatus according to claim 9, wherein the processor is further configured to:
emit a third sound signal by a speaker component in the sound collection device, wherein a code carried in the third sound signal has a character bit that represents device information of the sound collection device.

13. The apparatus according to claim 9, wherein the processor is further configured to:
upload the space division information to a server.

14. The apparatus according to claim 9, wherein the sound source device is a smart home device having a sound transmitting component.

15. The apparatus according to claim 14, wherein the sound transmitting component is an energy conversion device capable of converting an electrical signal into a sound signal.

16. A space division apparatus implementing the method of claim 8, comprising:
a processor; and
a memory device storing instructions for execution by the processor to implement operations of the method.

17. A non-transitory computer-readable storage medium having instructions stored thereon for execution by a processing circuit to implement the space division method of claim 1.

18. A smart home system implementing the method of claim 1, comprising a plurality of smart devices including:
the sound collection device; and
the sound source device;
wherein the system is configured to:
confirm that the sound collection device and the sound source device are located in the same spatial region upon that the sound collection device successfully decodes the device information of the sound source device from the medium-high frequency sound signal of 500 kHz to 20 kHz with weaker penetrability, thereby reducing influences from noise in a background environment and improving accuracy of a space division result; and
generate the space division result including a plurality of spatial regions based on smart devices among the plurality of smart devices synchronized with sound signatures within a same spatial region.

* * * * *